US006789576B2

(12) United States Patent
Umetsu et al.

(10) Patent No.: US 6,789,576 B2
(45) Date of Patent: Sep. 14, 2004

(54) ACCUMULATOR

(75) Inventors: Chiharu Umetsu, Yokohama (JP); Koji Nakamura, Yokohama (JP); Hiroshi Mizukami, Yokohama (JP); Koichiro Yamada, Yokohama (JP)

(73) Assignee: NHK Spring Co., Ltd, Kanagawa (JP)

( * ) Notice: Subject to any disclaimer, the term of this patent is extended or adjusted under 35 U.S.C. 154(b) by 0 days.

(21) Appl. No.: 09/866,479

(22) Filed: May 29, 2001

(65) Prior Publication Data

US 2002/0020758 A1 Feb. 21, 2002

(30) Foreign Application Priority Data

May 30, 2000 (JP) ....................................... 2000-160223
May 30, 2000 (JP) ....................................... 2000-160224

(51) Int. Cl.[7] ................................................ F16L 55/04
(52) U.S. Cl. ........................... 138/30; 138/31; 220/721; 303/87
(58) Field of Search ............................. 138/31, 30, 26; 220/721; 303/87

(56) References Cited

U.S. PATENT DOCUMENTS 3,918,497 A * 11/1975 Schon .......................... 138/30
3,963,053 A 6/1976 Mercier ........................ 138/30
4,010,773 A 3/1977 Bihlmaier ..................... 138/30
4,055,067 A * 10/1977 Kozima ........................ 72/328
4,299,254 A * 11/1981 Zahid ........................... 138/30
4,348,792 A * 9/1982 Zahid ........................... 138/30
4,881,725 A * 11/1989 Shioda et al. ............... 267/179
6,286,552 B1 * 9/2001 Shimbori et al. ............. 138/30

FOREIGN PATENT DOCUMENTS

| | | | |
|---|---|---|---|
| DE | 1232418 | 1/1967 | |
| DE | 2029457 | 12/1971 | |
| FR | 1373342 | 1/1965 | |
| JP | 61222642 A | * 10/1986 | ........... B21D/19/08 |
| JP | 63260631 A | * 10/1988 | ........... B21D/19/08 |
| JP | 01104421 A | * 4/1989 | ........... B21D/19/08 |
| JP | 04083902 | 3/1992 | |
| JP | 11000724 A | * 1/1999 | ........... B21D/28/10 |
| JP | 2002346682 A | * 12/2002 | .............. B21J/5/08 |
| WO | WO 99/17029 | 8/1999 | |

OTHER PUBLICATIONS

Partial European Search Report, Application No. EP 01 11 3085; Sep. 4, 2001.

* cited by examiner

*Primary Examiner*—Patrick Brinson
(74) *Attorney, Agent, or Firm*—Arent Fox PLLC

(57) ABSTRACT

Disclosed is an accumulator comprising a cylindrical shell including a cylindrical portion, a partitioning member for partitioning the interior of the shell into a hydraulic chamber and a gas chamber, and a port including a hydraulic fluid flow path for communicating the exterior of the shell and the hydraulic chamber. The variation of the pressure of a hydraulic fluid flowing into the hydraulic chamber is accommodated by expansion and compression of a gas in the gas chamber according to expansion and contraction of the partitioning member. The port is approximately airtightly inserted into the cylindrical portion of the shell, and is welded to an outer circumference of the cylindrical portion by means of welding.

6 Claims, 5 Drawing Sheets

ACCUMULATOR

BACKGROUND OF THE INVENTION

1. Field of the Invention

The present invention relates to an accumulator used for, for example, hydraulic circuits in hydraulic control apparatuses, specifically relates to a securing structure for hydraulic ports with respect to sealed vessels (shells) for hydraulic fluids and gases, and relates to a protecting structure for a partitioning member installed therein.

2. Background Art

The accumulator such as the above generally comprises a cylindrical shell partitioned into a gas chamber and a hydraulic chamber by a bellows. The pressure variation of the hydraulic fluid flowing into the hydraulic vessel is accommodated by the expansion and compression of the gas in the gas chamber according to the elastic motion of the bellows. The accumulator is widely used in devices such as a hydraulic circuit in automobiles for effectively inhibiting pulsation in the hydraulic fluid flowing therein.

In FIG. 5, an example of a conventional accumulator is shown, and reference numeral 80 is a cylindrical shell which forms a sealed vessel by joining a bottom shell 81 and a cap shell 82. Reference numeral 83 is a metallic bellows assembly partitioning the interior of the shell 80 into a hydraulic chamber 91 and a gas chamber 92. Reference numeral 93 is a port comprising a flow path 93*a* for communicating a hydraulic circuit (not shown) and the hydraulic chamber 91. The bellows assembly 83 forms the hydraulic chamber 91 therein, and comprises bellows 84 elastically moving in the axial direction of the shell 80, and a bottom seal 85 and a bellows cap 86 joined to both ends of the bellows 84. The bottom seal 85 is joined to the cap shell 82.

The bellows cap 86 is a free end of the bellows assembly 83. The circumference of the bellows cap 86 is mounted with a circular bellows guide 87 which slides with the inner surface of the shell 80 so as to guide the elastic movement of the bellows 84 in the axial direction.

The axial length of the bottom shell 81 is longer than that of the cap shell 82. The joining portion of the shells 81 and 82 approximately faces the bellows 84 even if the bellows 84 is in the most contracted condition.

In such an accumulator, when the hydraulic fluid flows into the hydraulic chamber 91 via the flow path 93a and the pressure of the hydraulic fluid exceeds the gas pressure in the gas chamber 92, the bellows 84 expands, and the gas in the gas chamber 92 is compressed. In contrast, when the hydraulic fluid pressure in the hydraulic chamber 91 is below the gas pressure in the gas chamber 92, the bellows 84 is contracted and the gas in the gas chamber 92 is expanded. Due to the expansion and compression of the gas in the gas chamber 92, the variation of the pressure of the hydraulic fluid in the hydraulic circuit is accommodated and pulsation thereof is inhibited. The two-dot chain line in FIG. 5 shows the position of the bellows cap 73 when the bellows assembly 70 is in the most expanded condition.

The port 93 in the conventional accumulator is joined to the cap shell 82 by projection welding, or the like, which is one type of resistance welding. Welding produces sparks in some cases, and splashed material adheres to the inner surface of the port 93 and the cap shell 82, thereby contaminating therein. When the accumulator is assembled with the contamination, the hydraulic fluid is contaminated and results in malfunctioning of the accumulator. Although cleaning is performed to remove the contamination, it is difficult to completely remove the contamination since there are portions where the cleaning is not easily performed. Furthermore, the cleaning is labor intensive, and the production efficiency is decreased.

In assembly of the conventional accumulator, the bottom shell 81 is welded to the cap shell 82 after joining the bellows assembly 83 to cap shell 82 by welding. Similarly in this case, when the shells 81 and 82 are welded by projection welding, sparks are emitted to the interior of the shell 80, and the bellows 84 may be damaged. Although the service life of the bellows is shortened when the bellows 84 is damaged, it cannot be ascertained whether the bellows 84 is damaged since it is contained in the shell 80, and the normal operation of the accumulator cannot be ensured.

SUMMARY OF THE INVENTION

An object of the present invention is to provide an accumulator in which contamination of the interior thereof due to sparks emitted in welding a port can be inhibited and the production efficiency can be improved.

Another object of the invention is to provide an accumulator in which damage to a bellows due to sparks emitted in welding shells can be inhibited and the normal operation of the accumulator in over the long term can be ensured.

The present invention provides an accumulator comprising: a cylindrical shell including a cylindrical portion; a partitioning member for partitioning the interior of the shell into a hydraulic chamber and a gas chamber; and a port including a hydraulic fluid flow path for communicating the exterior of the shell and the hydraulic chamber. Variation of pressure of a hydraulic fluid flowing into the hydraulic chamber is accommodated by expansion and compression of a gas in the gas chamber according to expansion and contraction of the partitioning member. The port is approximately airtightly inserted into the cylindrical portion of the shell, and is welded to an outer circumference of the cylindrical portion by means of welding.

According to the invention, the port is approximately airtightly press fitted into the cylindrical portion of the shell, and the inner surface of the cylindrical portion and the outer surface of the port are closely contacted to each other. Therefore, the outer ridge portion of the cylindrical portion is isolated from the interior of the shell. As a result, when sparks occur during welding, the sparks are not emitted into the interior of the shell, and the interior of the shell is not contaminated by splashing of the sparks. Therefore, the contamination in the shell can be easily controlled and the production efficiency can be improved. Furthermore, even if sparks are emitted in the shell the sparks remain in the gas chamber and do not enter into the hydraulic chamber, so that the system including the hydraulic circuit to which the accumulator is connected is not contaminated by splashing of the sparks.

According to the preferable feature of the invention, in which the overall length of the accumulator can be shortened, the cylindrical portion is projected into the interior of the shell. Several kinds of forming method can be applied to the feature, but burring in which a through hole is formed in the shell and a punch having larger diameter than that of the through hole is press fitted thereinto is preferable.

The partitioning member may comprise a fixed portion and a movable portion mounted to the fixed portion via an elastic member, which corresponds to the bellows assembly 83 in the conventional accumulator in FIG. 5. The fixed portion, the elastic member, and the movable portion correspond to the bottom seal, the bellows, and the bellows cap respectively. It is preferable feature that the fixed portion is integrally formed with the port. Heretofore, the fixed portion (bottom seal) has been joined to the inner surface of the cap shell, so that sparks occurring in welding results in problems of contamination similarly in the port. However, by integrating the fixed portion with the port, the fixed portion needs not to be welded to the cap shell, and the problems due to the sparks can be solved.

According to another preferable feature of the invention, the shell comprises plural divided shell bodies joined to each other. The partitioning member includes a guide for sliding on an inner surface of the shell so as to guide the expansion and contraction of the partitioning member along an axial direction thereof. The joined portion between the divided shell bodies is positioned outside the region where the bellows guide moves. The guide slides within an inner surface of one divided shell body. According to the feature, even if a step is formed at the joined portion of the divided shell bodies (boundary between both), the guide can slide smoothly with no influence from the step, and is not damaged by the joined portion, so that durability thereof can be improved.

According to another aspect of the invention, the invention provides an accumulator comprising: a cylindrical shell including plural divided shell bodies joined to each other in an axial direction thereof; a partitioning member for partitioning the interior of the shell into a hydraulic chamber and a gas chamber, the partitioning member expanding and contracting in the axial direction of the shell; and a guide provided at a free end of the partitioning member, the guide guiding the expansion and contraction of the partitioning member along an axial direction thereof is provided. Variation of the pressure of a hydraulic fluid flowing into the hydraulic chamber is accommodated by expansion and compression of a gas in the gas chamber according to expansion and contraction of the partitioning member. A protecting member is provided between a joined portion of the divided shell bodies and the partitioning member so as to screen both.

The divided shell bodies correspond to the bottom shell and the cap shell respectively, and the partitioning member corresponds to the bellows assembly in the conventional accumulator in FIG. 5. According to the invention, the divided shell bodies are joined to each other by joining means such as projection welding. Sparks occurring in the welding are blocked by the protecting member and cannot strike the partitioning member. Therefore, damage to the partitioning member is prevented and a long service life thereof is ensured, and normal operation of the accumulator can be ensured.

According to the specific feature of the protecting member, a sleeve coaxially aligned with the shell along the inner surface of the shell can be applied. The sleeve extends overall region where the guide moves according to the expansion and contraction of the partitioning member, and the guide slides on a inner surface of the sleeve. According to the feature, the guide moves smoothly sliding on the sleeve, and the partitioning member usually operates in normal manner.

According to another specific feature of the protecting member, it may be a ring-shaped member covering an inner surface of the joined portion of the divided shell bodies. In this case, the ring-shaped member is preferably positioned outside the region where the guide moves, and the guide slides within an inner surface of one divided shell body. According to the feature, even if a step is formed between the divided shell bodies and the ring-shaped member (boundary between both), the guide can slide smoothly with no influence from the step, and the partitioning member can usually operates in normal manner.

DETAILED EXPLANATION OF THE INVENTION

Preferred embodiments of the invention will be explained in detail hereinafter.

Figure 1:
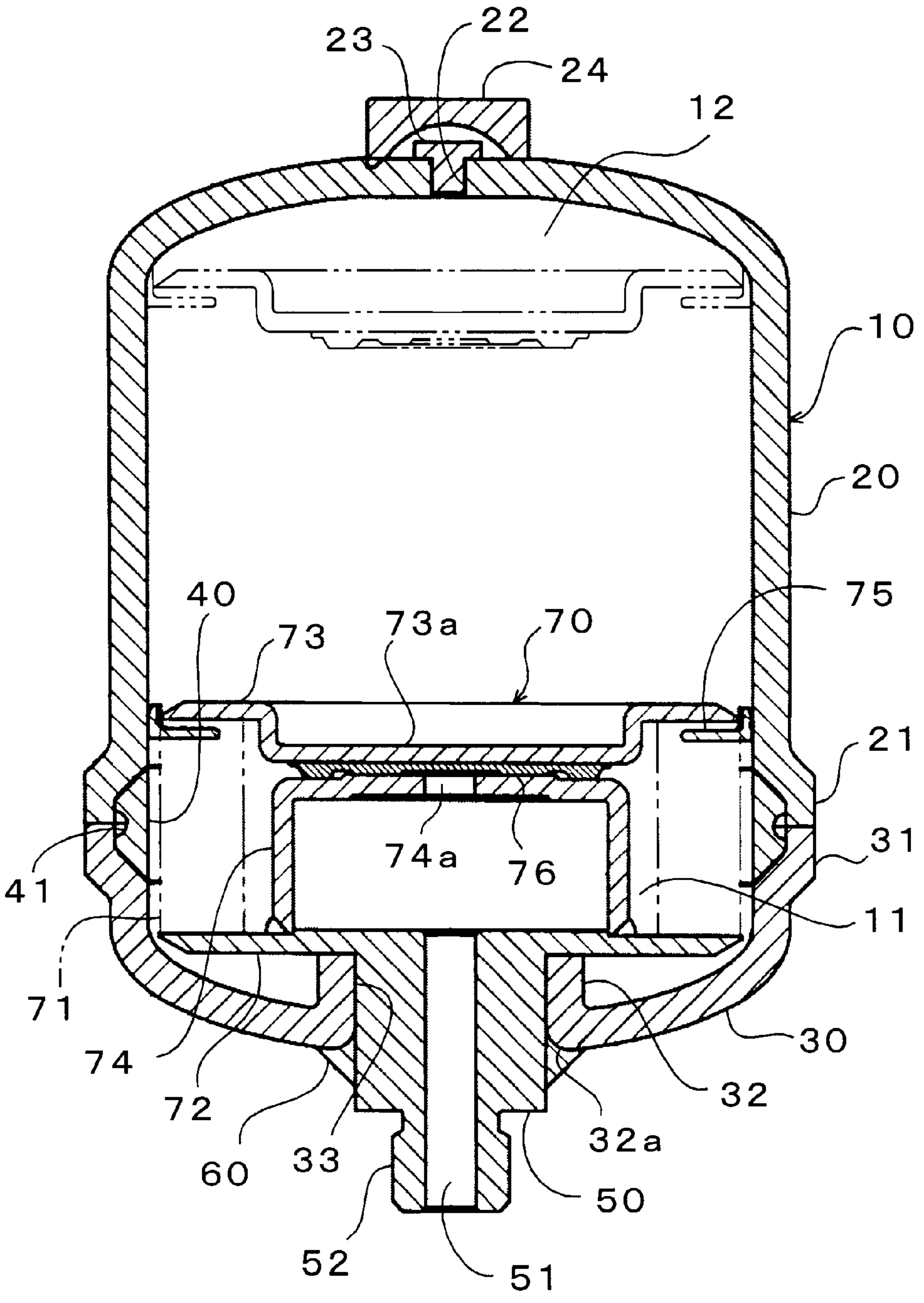
FIG. 1 is a vertical cross section of an accumulator of a first embodiment according to the invention.

FIG. 1 is a cross section showing an accumulator of a first embodiment according to the invention. In FIG. 1, reference numeral 10 is a cylindrical shell forming a sealed vessel.

The shell 10 consists of a bottom shell (divided shell body) 20 as a main body and a cap shell (divided shell body) 30 which are joined to each other by welding and are divided in the axial direction. The length in the axial direction of the bottom shell 20 is longer than that of the cap shell 30. axial direction of the bottom shell 20 is longer than that of the cap shell 30. The shells 20 and 30 are made from a metal such as steel and are formed by a press to an approximately uniform thickness. The axially extending body portions of the shells 20 and 30 are joined to each other by projection welding.

A circular circumferential portion 21 or 31 projecting outward is formed at the joining end of the shells 20 and 30 around the entire circumference thereof. The end surfaces of these circular circumferential portions 21 and 31 are joined to each other, and a circular recess having a trapezoidal cross section is formed therebetween. A bellows protector 40 is fitted into the circular recess. The bellows protector 40 is made from an insulating resin. The inner diameter of the bellows protector 40 is identical to that of the shell 10, and the outer surface thereof is formed with a groove 41 around the entire circumference.

A cylindrical portion 32 is formed at the center end portion of the cap shell 30 by inwardly (upward in FIG. 1) projecting the portion by means of burring. A port 50 is press fitted with an airtight seal into the through hole 33 of the cylindrical portion 32 from the inner side thereof. The port 50 has a flow path 51 for hydraulic fluid and projects outside from the through hole 33 of the cylindrical portion 32. The outer surface of the projected portion of the port 50 is formed with a screw portion 52 to which a hydraulic circuit (not shown) is connected.

The port 50 is fixed to the cap shell 30 by fillet welding the outer surface of the port 50 to the outer circumference **32*a* of the cylindrical portion 32. Reference numeral 60 is a bead formed by the welding, and is formed around the entire circumference of the port 50. The fillet welding is performed by arc welding or the like. A bottom seal 72 of a bellows assembly (partitioning member) 70, mentioned below, is integrally formed at the inner end of the port 50. The bottom seal 72 is brought into contact with the inner end surface of the cylindrical portion 32**.

The metallic bellows assembly 70 is contained in the shell 10 so as to partition the interior of the shell 10 into a hydraulic chamber 11 and a gas chamber 12. The bellows assembly 70 comprises an approximately cylindrical bellows (elastic member) 71 which can elastically move in the axial direction; the bottom seal (securing portion) 72 connected to an end of the bellows 71; a bellows cap (fixed portion) 73 connected to the other end of the bellows 71; and a resonance box 74 which is connected to the bottom seal 72 in the hydraulic chamber 11. The inner space of the bellows assembly 70 forms the hydraulic chamber 11. The space formed between the bellows assembly 70 and the shell 10 is the gas chamber 12. Welding method such as TIG welding and plasma arc welding is applied to connect the bottom seal 72 and the bellows cap 73 to the bellows 71, and to connect the resonance box 74 to the bottom seal 72.

The bellows cap 73 comprises a recess 73*a* projecting into the hydraulic chamber 11, of which the flanged circumference is mounted with a ring-shaped bellows guide 75. The bellows guide 75 is fitted into the inner surface of the bottom shell 20 in a sliding condition, and guides the bellows cap 73 so as not to vibrate when the bellows 71 moves elastically. The bellows guide 75 comprises plural grooves (not shown) which communicate both portions of the gas chamber 12 partitioned thereby, and the grooves make the gas pressure in the gas chamber 12 uniform.

The joining portion between the shells 20 and 30 in which the bellows guide 75 is supported faces the bellows 71 when the bellows 71 is in the most contracted condition. That is, the joining portion of the shells 20 and 30 is positioned outside the region where the bellows guide 75 moves. Two-dot chain line shows the position of the bellows cap 73 when the bellows assembly 70 is in the most expanded condition.

A through hole 74*a* is provided for communicating the interior and the exterior of the resonance box 74. A self seal 76 made from a rubber is secured to the inner surface of the bellows cap 73 in the hydraulic chamber 11. The self seal 76 can close the through hole 74*a* of the resonance box, and can prevent excess compression of the bellows 71 and damage to the bellows cap 73 due to this.

A hydraulic fluid is flowed into the hydraulic chamber 11 from the hydraulic circuit via flow path 51 of the port 50. An inert gas such as nitrogen gas is charged in the gas chamber 12 at a predetermined pressure. The inert gas is charged into the gas chamber 12 through a gas feeding through hole 22 formed at the center end of the bottom shell 20. The gas feeding through hole 22 is sealed by a plug 23 secured to the bottom shell 20. A head 24 which has a hexagonal cross section and covers the plug 23 is secured to the center end of the bottom shell 20. The plug 23 and the head 24 are secured to the bottom shell 20 by means of welding such as projection welding.

According to the above-constructed first embodiment of the accumulator, when the hydraulic fluid flows into the hydraulic chamber 11 via the flow path 51 and the pressure of the hydraulic fluid exceeds the gas pressure in the gas chamber 12, the bellows 71 expands and the gas in the gas chamber 12 is compressed. In contrast, when the hydraulic fluid pressure in the hydraulic chamber 11 is below the gas pressure in the gas chamber 12, the bellows 71 is contracted and the gas in the gas chamber 12 is expanded. Due to the expansion and compression of the gas in the gas chamber 12, the variation of the pressure of the hydraulic fluid in the hydraulic circuit is accommodated and pulsation thereof is inhibited. When the pressure of the hydraulic fluid is below the operating pressure of the accumulator, pulsation is absorbed by the hydraulic fluid in the resonance box 74.

When the hydraulic pressure in the resonance box 74 is reduced, the bellows 71 is contracted to maintain the hydraulic pressure in the resonance box 74. When the hydraulic pressure in the resonance box 74 is below the gas pressure in the gas chamber 12, the self seal 76 closely contacts the resonance box 74 so as to close the through hole 74*a*, and the hydraulic chamber 11 is self-sealed so that the pressure therein is higher than that of the gas chamber 12.

When the bellows 71 is in the most contracted condition, the bellows guide 75 is positioned at the bottom shell 20 side rather than the joining portion of the bottom shell 20 and the cap shell 30, and the joining portion of the shells 20 and 30 covered by the bellows protector 40 faces the bellows 71. Therefore, the bellows guide 75 slides only on the inner surface of the bottom shell 20 in the elastic movement of the bellows 71.

Next, the process for assembling the above accumulator will be explained.

First, the resonance box 74 is welded to the bottom seal 72 integral with the port 50, and the bellows 71 is welded to the bottom seal 72, then the bellows cap 73 is welded to the bellows 71. TIG welding or plasma welding is applied to the above welding. Next, the port 50 is press fitted into the through hole 33 of the cylindrical portion 32 of the cap shell 30 from the inside thereof, and the outer circumference 32*a* of the cylindrical portion 32 and the port 50 are arc welded. Then, the bellows guide 75 is mounted to the bellows cap 73.

Next, the bottom shell 20 is abutted to the cap shell 30 in a condition in which the bellows protector 40 is fitted into the inner portions of the circular circumferential portions 21 and 31. Then, projection welding is performed to the abutted portion of the shells 20 and 30. In the welding, sparks are often emitted from the welded portion, and the sparks are blocked by the bellows protector 40. Therefore, damage to the bellows 71 is prevented and a long service life of the bellows 71 is ensured. Beads projecting from the inner and outer surfaces are formed according to the welding. The bead projecting from the inner surface is received in the groove 41 of the bellows protector 40. The bead projecting from the outer surface is preferably removed by machining or the like. In an alternative manner, the port 50 may be press fitted into the through hole 33 of the cylindrical portion 32 and the bellows assembly 70 may be assembled in the cap shell 30, the shells 20 and 30 may then be welded, and then the port 50 and the cap shell 30 may be welded.

A hydraulic fluid is charged into the hydraulic chamber 11 via flow path 51 for backup so as to exchange the air in the hydraulic chamber 11 with the hydraulic fluid. Then, a liquid is charged into the gas chamber 12 for adjusting the volume of gas, and an inert gas is charged into the gas chamber 12 through the gas feeding through hole 22. The plug 23 is inserted into the gas feeding through hole 22, and is welded to the bottom shell 20, and finally, the head 24 is welded to the bottom shell 20.

According to the accumulator in the first embodiment, the port 50 is airtightly press fitted into the cylindrical portion 32 formed in the cap shell 30, and the inner surface of the cylindrical portion 32 and the outer surface of the port 50 are closely contacted to each other. Therefore, the outer ridge portion of the cylindrical portion 32 is isolated from the interior of the cap shell 30. As a result, when sparks occur during welding the port 50 to the cap shell 50, the sparks are not emitted into the interior of the cap shell 30, and the interior of the cap shell is not contaminated by splashing of the sparks. Therefore, the contamination in the shell 10 can be easily controlled and the production efficiency can be improved.

Since the cylindrical portion 32 is projected into the interior of the cap shell 30, the overall length of the accumulator can be shorter and can be compact rather than the case in which the cylindrical portion 32 is projected outwardly. In order to form the cylindrical portion 32, several methods can be applied. Burring is preferably applied as in the embodiment since high precision can be easily obtained.

The bottom seal 72 forming the bellows assembly 70 is integrally formed with the port 50, so that the bottom seal 72 need not be welded to the cap shell 30, and contamination due to sparks can be prevented.

Furthermore, even if a step is formed between the bellows protector 40 and the shells 20 and 30 (boundary between both), the bellows guide 75 can slide smoothly with no influence from the step since the bellows guide 75 slides on the inner surface of the bottom shell 20. Therefore, the bellows 71 can usually operate in normal manner, and the bellows guide 75 is not damaged and durability thereof can be improved.

(2) Second Embodiment

Figure 2:
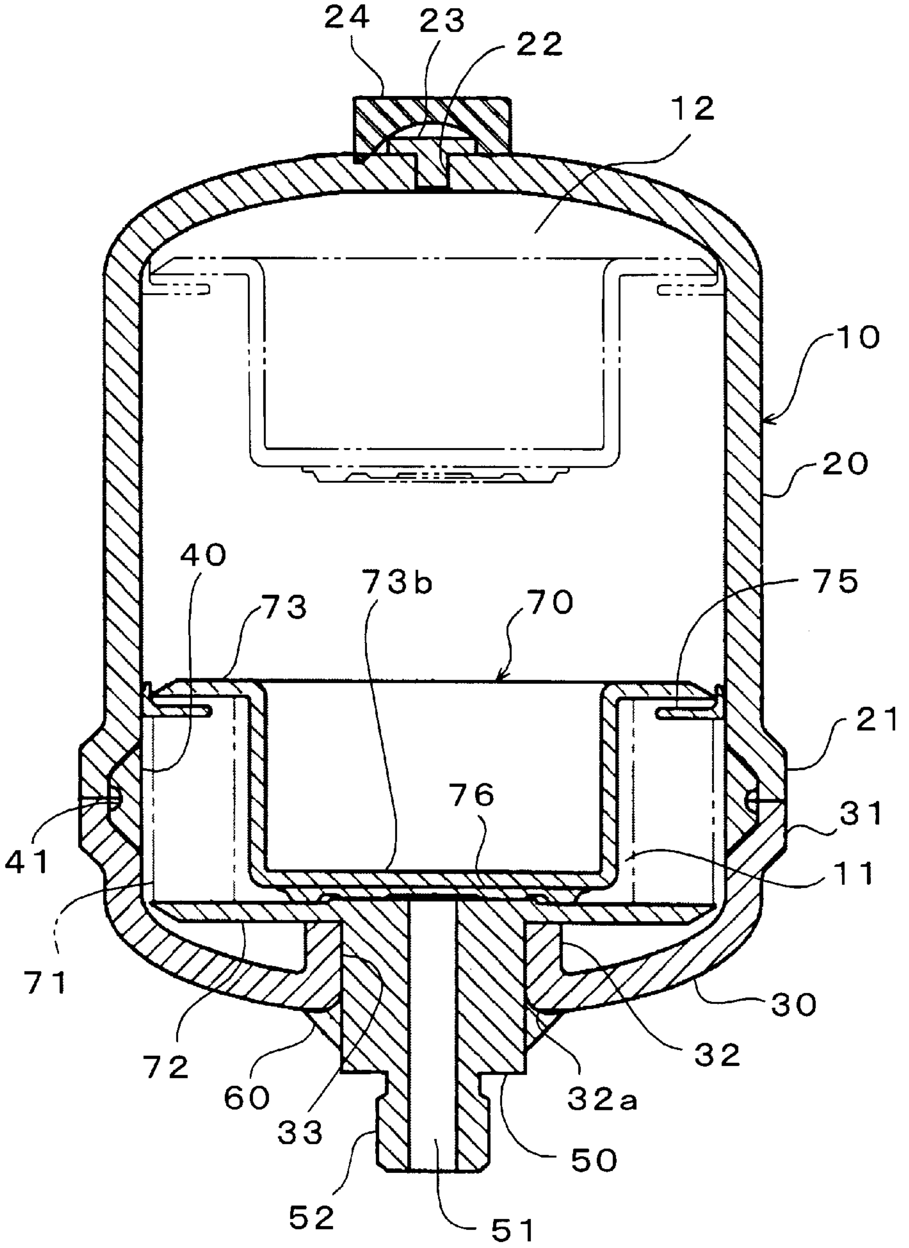
FIG. 2 is a vertical cross section of an accumulator of a second embodiment according to the invention.

A second embodiment will be explained with reference to FIG. 2 hereinafter. In FIG. 2, numerals corresponding to those in the first embodiment are attached to the same elements as in the first embodiment, and explanation thereof are omitted.

The accumulator in the embodiment has the same essential structure as the first embodiment except that the resonance box 74 in the first embodiment is not used to, and the depth of the recess 73*b* of the bellows cap 73 is larger than that of the recess 73*a* in the first embodiment. Therefore, when the bellows 71 is in the most contracted condition, a self seal 76 adhered to the inner surface of the bellows cap 73 directly closes the flow path 51 of the port 50. The two-dot chain line in FIG. 2 shows the position of the bellows cap 73 when the bellows assembly 70 is in the most expanded condition.

Similarly in the accumulator in the embodiment, the port 50 is airtightly press fitted into the cylindrical portion 32 formed in the cap shell 30, and the outer circumference of the cylindrical portion 32 and the outer surface of the port 50 is fillet welded by arc welding or the like. Therefore, contamination in the shell due to sparks occurring in the welding can be prevented. Moreover, the advantages in the first embodiment can be obtained. That is, the structure can be compact since the cylindrical portion 32 is projected into the interior of the cap shell 30, and contamination can be prevented since the bottom seal 72 is integrally formed with the port 50.

(3) Third Embodiment

Figure 3:
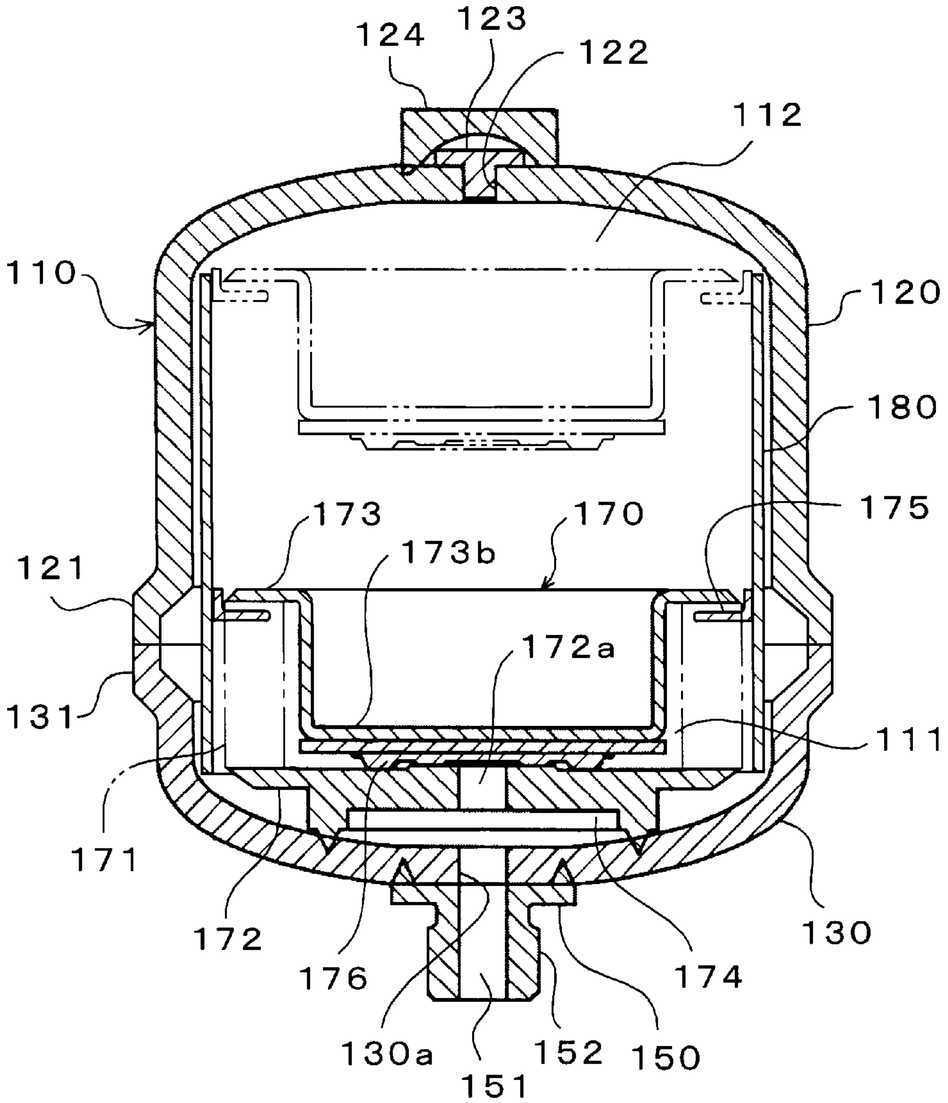
FIG. 3 is a vertical cross section of an accumulator of a third embodiment according to the invention.
Figure 5:
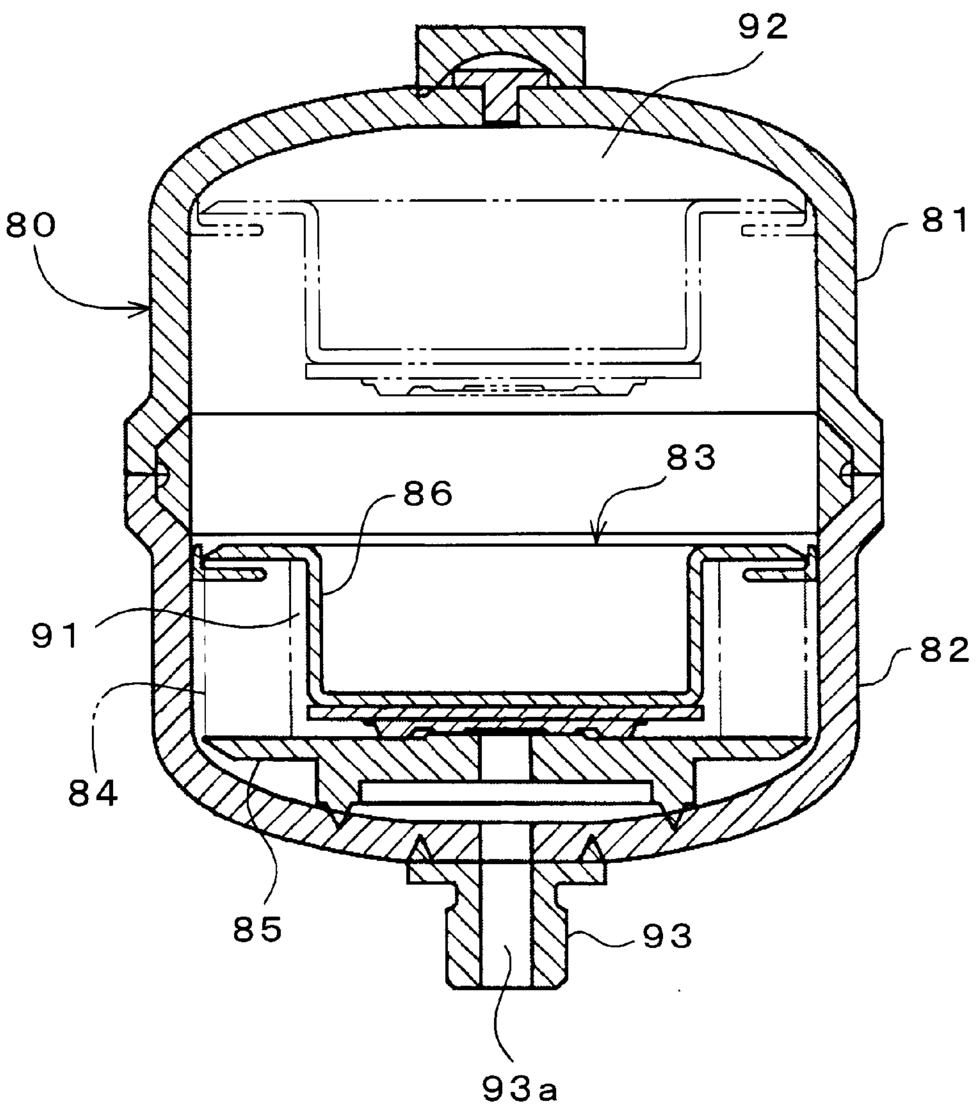
FIG. 5 is a vertical cross section of a conventional accumulator.

FIG. 3 shows an accumulator of a third embodiment according to the invention. In FIG. 3, numerals corresponding to those in FIG. 5 are attached to the same elements as in the first embodiment, and explanations thereof are simplified or omitted.

The shell 110 consists of a bottom shell (divided shell body) 120 and a cap shell (divided shell body) 130 which are joined to each other by welding. A circular circumferential portion 121 or 131 projecting outward is formed at the joining end of the shells 120 and 130 around the entire circumference thereof. The circular circumferential portions 121 and 131 are formed for reinforcement and so as not to project a bead formed in welding both by projection welding, which is a kind of resistance welding, from the inner surface of the shell 110.

The bellows assembly (partitioning member) 170 is contained in the shell 110 so as to partition the interior of the shell 110 into a hydraulic chamber 111 and a gas chamber 112. The bellows assembly 170 comprises a bellows 171, a bottom seal 172 and a bellows cap 173 respectively connected to both ends of the bellows 71. The bottom seal 172 is joined to the cap shell 130 so as to form a resonance box 174, so that the bellows assembly 170 is secured to the interior of the shell 110. A through hole 172*a* for communicating the resonance box 174 and the hydraulic chamber 111 is formed at the center of the bottom seal 172. Welding method such as TIG welding and plasma arc welding is applied to connect the bottom seal 172 and the bellows cap 173 to the bellows 171. Projection welding is applied to connect the bottom seal 172 to the cap shell 130.

The bellows cap 173 comprises a recess 173*b* projecting into the hydraulic chamber 111, of which a flanged circumference is mounted with a ring-shaped bellows guide 175. The bellows guide 175 guides the bellows cap 173 so as not to vibrate when the bellows 171 moves elastically. The bellows guide 175 comprises plural grooves (not shown) which communicate both portions of the gas chamber 112 partitioned thereby, and the grooves make the gas pressure in the gas chamber 112 uniform. A self seal 176 made from a rubber is adhered to the inner surface of the bellows cap 173 in the hydraulic chamber 111. The self seal 176 can prevent excess compression of the bellows 171 and damage to the bellows cap 173 due to this.

A through hole 130*a* communicated to the resonance box 174 is formed at the center end of the cap shell 130. A port 150 having a hydraulic fluid flow path 151 linearly aligned and connected to the through hole 130*a* is connected to the outer surface of the cap shell 130 by projection welding. The port 150 comprises a screw portion 152 to which a hydraulic circuit (not shown) is connected. A hydraulic fluid is flowed into the hydraulic chamber 111 from the hydraulic circuit via flow path 151 of the port 150, the through hole 130*a* of the cap shell 130, the resonance box 174, and the through hole 172*a* of the bottom seal 172.

An inert gas such as nitrogen gas is charged at a predetermined pressure in the gas chamber 112. A gas feeding through hole 122 is formed at the center end of the bottom shell 120 for charging the inert gas into the gas chamber 112. The gas feeding through hole 122 is sealed by a plug 123 secured to the bottom shell 120. A head 124 which has a hexagonal cross section and covers the plug 123 is secured to the center end of the bottom shell 120. The plug 123 and the head 124 are secured to the bottom shell 120 by means of welding such as projection welding.

In this embodiment, a sleeve 180 with a uniform diameter is disposed in the shell 110. The sleeve 180 extends over the overall length of the body portion of the shell 110, and is coaxially aligned with the shell 110 maintaining a slight clearance with the inner surface of the shell 110. The sleeve 180 is located between joined portion of the bottom shell 120 and the cap shell 130, and the bellows 171 so as to screen both. The bellows guide 175 slides on the inner surface of the sleeve 180. The sleeve 180 is preferably made from an insulating resin, and the inner surface thereof is preferably treated with Teflon (trademark) so that the bellows guide 175 can slide smoothly and high durability can be obtained. The sleeve is not secured to other parts since the movement thereof is restricted by abutting to the each shell 120 and 130, but may be adhered to the shells 120 and 130 if necessary.

According to the embodiment of the accumulator, when the hydraulic fluid flows into the hydraulic chamber 111 via the flow path 151, through hole 130*a*, the resonance box 174, and the through hole 172*a*, and the pressure of the hydraulic fluid exceeds the gas pressure in the gas chamber 112, the bellows 171 expands and the gas in the gas chamber 112 is compressed. In contrast, when the hydraulic fluid pressure in the hydraulic chamber 111 is below the gas pressure in the gas chamber 112, the bellows 171 is contracted and the gas in the gas chamber 112 is expanded. Due to the expansion and compression of the gas in the gas chamber 112, the variation of the pressure of the hydraulic fluid in the hydraulic circuit is accommodated and pulsation thereof is inhibited. The expansion and contraction of the bellows 171 is guided in the axial direction of the shell 110 by sliding and moving the bellows guide 175 along the inner surface of the sleeve 180. The two-dot chain line in FIG. 3 shows the position of the bellows cap 173 when the bellows assembly 170 is in the most expanded condition.

When the hydraulic pressure in the resonance box 174 is reduced, the bellows 171 is contracted to maintain the hydraulic pressure in the resonance box 174. When the hydraulic pressure in the resonance box 174 is below the gas pressure in the gas chamber 112, the self seal 176 closely contacts the resonance box 174 so as to close the through hole 172*a*, the hydraulic chamber 111 is self-sealed so that the pressure therein is higher than that of the gas chamber 112.

Next, the process for assembling the above accumulator will be explained.

First, the bottom seal 172 and the bellows cap 173 are welded to the bellows 171 to assemble the bellows assembly 170. The port 150 and the bottom seal 172 is welded to the cap shell 130, and the bellows guide 175 is mounted to the bellows cap 173. Then, the sleeve 180 is inserted into the bottom shell 120. The cap shell 130 is abutted to the bottom shell 120 during insertion of the bellows assembly 170 into the sleeve 180, and the shells 120 and 130 are welded. A hydraulic fluid is charged into the hydraulic chamber 111 via flow path 151 for backup so as to exchange the air in the hydraulic chamber 111 with the hydraulic fluid. Then, a liquid is charged into the gas chamber 112 for adjusting the volume of a gas, and an inert gas is charged into the gas chamber 112 through the gas feeding through hole 122. The plug 123 is inserted into the gas feeding through hole 122, and is welded to the bottom shell 120, and finally, the head 124 is welded to the bottom shell 120.

According to the accumulator in the embodiment, in the welding, sparks are often emitted from the welded portion, the sparks are blocked by the sleeve 180 and cannot strike the bellows 171. Therefore, damage to the bellows 171 due to the sparks is prevented and a long service life of the bellows 171 is ensured. As a result, the normal operation of the accumulator can be ensured. Furthermore, even if sparks are emitted in the shell 110, the sparks remain in the gas chamber 112 and do not enter into the hydraulic chamber 111, so that the system including the hydraulic circuit to which the accumulator is connected is not contaminated by splashing of the sparks. Moreover, since the bellows guide 175 slides on the inner surface of the sleeve 180, the bellows guide 175 can slide smoothly with no influence from the joined portion of the shells 120 and 130, and the bellows 171 can usually operate in normal manner.

(4) Fourth Embodiment

Figure 4:
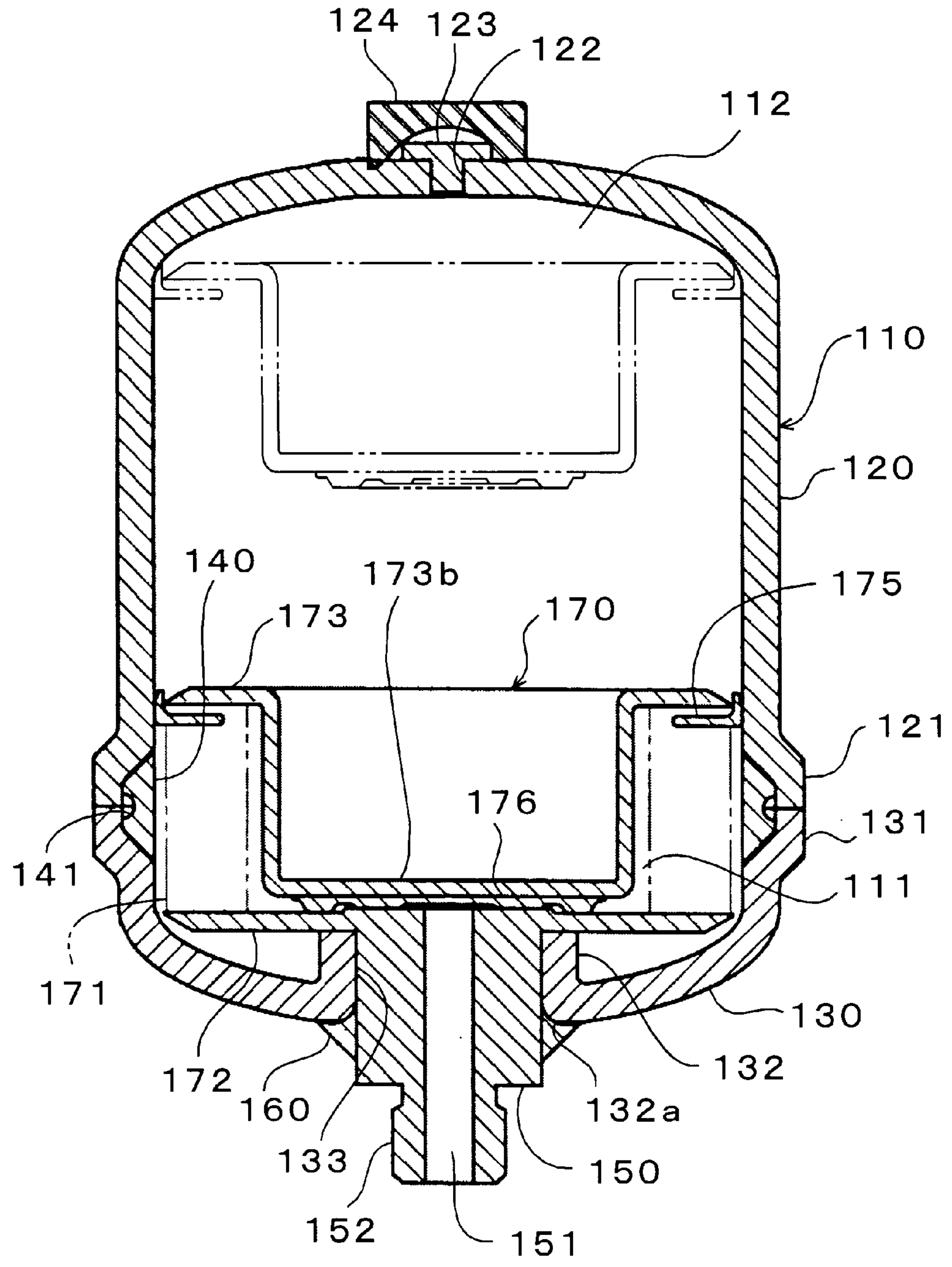
FIG. 4 is a vertical cross section of an accumulator of a fourth embodiment according to the invention.

A fourth embodiment will be explained with reference to FIG. 4 hereinafter. In FIG. 4, numerals corresponding to those in the third embodiment are attached to the same elements as in the third embodiment, and explanations of these elements are omitted.

The difference features in the fourth embodiment from the third embodiment will be described.

A cylindrical portion 132 is formed at the center end portion of the cap shell 130 by inwardly (upward in FIG. 4) projecting the portion by means of burring. A port 150 is press fitted with an airtight seal into the through hole 133 of the cylindrical portion 132 from the inner side thereof. The port 150 projects outward from the through hole 133 of the cylindrical portion 132.

The port 150 is fixed to the cap shell 130 by fillet welding the outer surface of the port 150 to the outer circumference 132*a* of the cylindrical portion 132. Reference numeral 160 in FIG. 4 is a bead formed by the welding, and is formed around the entire circumference of the port 150. A bottom seal 172 of a bellows assembly 170 is integrally formed at the inner end of the port 150. The bottom seal 172 is brought into contact with the inner end surface of the cylindrical portion 132.

A circular recess having a trapezoidal cross section is formed at the inside of the circular circumferential portions 121 and 31. A bellows protector (ring member, protecting member) 140 is provided in the recess instead of the sleeve 180 in the third embodiment. The bellows protector 140 is made from an insulating resin. The inner diameter of the bellows protector 140 is identical to that of the shell 110, and the outer surface thereof is formed with a groove 141 around the entire circumference.

This embodiment does not include the resonance box 174 as in the third embodiment. A self seal 176 is adhered to the inner surface of the bellows cap 173, and directly closes the flow path 151 of the port 150 when the bellows 171 is in the most contracted condition. The bellows guide 175 moves according to expansion and contraction of the bellows 171 sliding on the inner surface of the bottom shell 120. The bellows protector 140 is positioned outside the region where the bellows guide 175 moves. Two-dot chain line shows the position of the bellows cap 173 when the bellows assembly 170 is in the most expanded condition.

The operation of the accumulator in the embodiment is approximately same as the third embodiment except that the bellows guide slides on the inner surface of the bottom shell 120.

Next, the process for assembling the above accumulator will be explained.

First, the bellows 171 is welded to the bottom seal 172 integrally formed with the port 150, and the bellows cap 173 is welded to the bellows 171, thereby assembling the bellows assembly 170, and the bellows guide 175 is then mounted to the bellows cap 173. Then, the port 150 is press fitted into the through hole 133 of the cylindrical portion 132 of the cap shell 130 from the inside thereof, and the outer circumferential 132*a* of the cylindrical portion 132 and the port 150 are welded.

Then, the bottom shell 120 is abutted to the cap shell 130 in a condition in which the bellows protector 140 is fitted into the inner portions of the circular circumferential portions 121 and 131. Then, welding is performed to the abutted portion of the shells 120 and 130. In the welding, a bead often projects from the inner surfaces, the bead is received in the groove 141 of the bellows protector 140. In an alternative manner, the port 150 may be press fitted into the through hole 133 of the cylindrical portion 132 and the bellows assembly 170 may be assembled in the cap shell 130, the shells 120 and 130 may be then welded, and then the port 150 and the cap shell 130 may be welded. Next, a hydraulic fluid is charged into the hydraulic chamber 111 for backup, a liquid is charged into the gas chamber 112 for adjusting the volume of gas, and an inert gas is charged into the gas chamber 112 through the gas feeding through hole 122. The plug 23 is inserted into the gas feeding through hole 122, and is welded to the bottom shell 120, and finally, the head 124 is welded to the bottom shell 120.

According to the accumulator in the embodiment, the shells 120 and 130 are joined by means of projection welding or the like. In the welding, sparks emitted from the welded portion are blocked by the bellows protector 140 and do not strike the bellows 171. Therefore, damage to the bellows 171 due to the sparks can be prevented and a long service life is ensured. As a result, normal operation of the accumulator can be ensured in a long term. Furthermore, even if a step is formed between the bellows protector 140 and the shells 120 and 130 (boundary between both), the bellows guide 175 can slide smoothly with no influence from the step since the bellows guide 175 slides on the inner surface of the bottom shell 120. Therefore, the bellows 171 can usually operates in normal manner. Moreover, the advantage in which the emitted sparks in the shell 110 remains in the gas chamber 112 as in the third embodiment can obtained.

It should be noted that the metallic bellows assembly is used as a partitioning member for partitioning the interior of the shell into the hydraulic chamber and the gas chamber in the embodiments. The bellows assembly can be formed from materials other than metals. Furthermore, the partitioning member is not limited to bellows assemblies, but pistons, diaphragms, and balloons can be used. In this case, these partitioning members may be accompanied with an airtight seal with respect to shells according to the kind thereof.

What is claimed is:

1. An accumulator comprising:

a cylindrical shell including a cylindrical portion;

a partitioning member for partitioning an interior of the shell into a hydraulic chamber and a gas chamber; and a port including a hydraulic fluid flow path for communicating an exterior of the shell and the hydraulic chamber;

wherein variation of pressure of a hydraulic fluid flowing into the hydraulic chamber is accommodated by expansion and compression of a gas in the gas chamber according to expansion and contraction of the partitioning member;

the port is approximately airtightly inserted into the cylindrical portion of the shell, and is welded to an outer circumference of the cylindrical portion by means of welding;

wherein the shell comprises plural divided shell bodies joined to each other;

the partitioning member includes a guide for sliding on an inner surface of the shell so as to guide the expansion and contraction of the partitioning member along an axial direction thereof; and a joined portion between the divided shell bodies is positioned outside the region where the guide moves, and the guide slides within an inner surface of one divided shell body.

2. An accumulator according to claim 1, wherein the partitioning member comprises a fixed portion and a movable portion mounted to the fixed portion via an elastic member, and the fixed portion is integrally formed with the port.

3. An accumulator comprising:

a cylindrical shell including plural divided shell bodies joined to each other in an axial direction thereof;

a partitioning member for partitioning the interior of the shell into a hydraulic chamber and a gas chamber, the partitioning member expanding and contracting in the axial direction of the shell; and a guide provided at a free end of the partitioning member, the guide guiding the expansion and contraction of the partitioning member along an axial direction thereof;

wherein variation of the pressure of a hydraulic fluid flowing into the hydraulic chamber is accommodated by expansion and compression of a gas in the gas chamber according to expansion and contraction of the partitioning member;

a protecting member is provided between a joined portion of the divided shell bodies and the partitioning member so as to screen both; and the protecting member is a sleeve disposed in the shell, and the guide slides on an inner surface of the sleeve.

4. An accumulator according to claim 3, wherein the protecting member is a ring-shaped member covering an inner surface of the joined portion of the divided shell bodies.

5. An accumulator according to claim 4, wherein the ring-shaped member is positioned outside the region where the guide moves, and the guide slides within an inner surface of one divided shell body.

6. An accumulator according to claim 1, wherein the cylindrical portion is projected into the interior of the shell and formed by burring the shell.

* * * * *